US012668365B2

(12) United States Patent
Malecha et al.

(10) Patent No.: US 12,668,365 B2
(45) Date of Patent: Jun. 30, 2026

(54) AIRCRAFT PASSENGER SEAT ASSEMBLY WITH OVER CENTER BREAKOVER LINK

(71) Applicant: B/E Aerospace, Inc., Winston-Salem, NC (US)

(72) Inventors: Jeremy F. Malecha, Pfafftown, NC (US); Isaac Hale, Winston Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 215 days.

(21) Appl. No.: 18/423,926

(22) Filed: Jan. 26, 2024

(65) Prior Publication Data

US 2025/0242922 A1     Jul. 31, 2025

(51) Int. Cl.
*B64D 11/06*          (2006.01)

(52) U.S. Cl.
CPC .................................. *B64D 11/064* (2014.12)

(58) Field of Classification Search
CPC . B60N 2/22; B60N 2/42; B60N 2/427; B60N 2/42709; B64D 11/064; B64D 11/0619
See application file for complete search history.

(56) References Cited

U.S. PATENT DOCUMENTS

| | | | |
|---|---|---|---|
| 5,636,898 A | 6/1997 | Dixon et al. | |
| 5,836,547 A | 11/1998 | Koch et al. | |
| 6,296,306 B1 * | 10/2001 | Specht ................... | B60N 2/809 |
| | | | 297/216.13 |

| | | | |
|---|---|---|---|
| 6,478,256 B1 * | 11/2002 | Williamson ....... | B60N 2/42709 |
| | | | 297/216.14 |
| 6,811,225 B1 | 11/2004 | Konya et al. | |
| 7,540,562 B2 | 6/2009 | Sekida | |
| 8,403,415 B2 | 3/2013 | Lawson | |
| 9,315,120 B2 * | 4/2016 | Stewart ................... | B60N 2/22 |
| 10,414,501 B2 | 9/2019 | Thompson et al. | |
| 10,696,195 B2 * | 6/2020 | Young ................ | B60N 2/42709 |

(Continued)

FOREIGN PATENT DOCUMENTS

| | | | |
|---|---|---|---|
| DE | 102014206983 B4 | 6/2020 | |
| EP | 3658458 B1 | 5/2022 | |

(Continued)

OTHER PUBLICATIONS

European Patent Office, Extended European Search Report received in EP Application No. 25154269.2, May 7, 2025, 12 pages.

*Primary Examiner* — Joshua D Huson
*Assistant Examiner* — Vicente Rodriguez
(74) *Attorney, Agent, or Firm* — Suiter Swantz IP

(57)          ABSTRACT

An aircraft passenger seat assembly including spaced frame members and a pivotally attached seat bottom and seat back positioned between the spaced frame members. The seat bottom and the seat back are coupled to the frame members by upper and lower links positioned on opposite lateral sides of the seat back. During normal use of the seat, the upper and lower links rotate in a synchronous manner to articulate the seat between an upright sitting position and a reclined sitting position. During a dynamic event affecting the passenger seat, the lower links are fixed and the upper links are constrained to rotate over center of the seat back pivot axis to rotate the seat back forward past the upright sitting position.

20 Claims, 4 Drawing Sheets

(56)        References Cited

U.S. PATENT DOCUMENTS

2014/0239683  A1*    8/2014   Marini  ................... B60N 2/688
                                                       297/216.13
2023/0166843  A1*    6/2023   Bentley  ................ B64D 11/062
                                                       297/216.13
2023/0312096  A1    10/2023   Malatrasi et al.

FOREIGN PATENT DOCUMENTS

FR          2294667  A1    7/1976
JP          H06247198  A    9/1994

* cited by examiner

AIRCRAFT PASSENGER SEAT ASSEMBLY WITH OVER CENTER BREAKOVER LINK

TECHNICAL FIELD AND BACKGROUND

The present disclosure relates generally to an aircraft passenger seat, and more particularly, to a reclinable aircraft passenger seat equipped with a dynamic breakover assembly.

Virtually every aspect of aircraft passenger seat design is constrained by requirements imposed by safety, weight, and cost considerations. Regulatory requirements for aircraft components in the U.S. are based on Title 14 of the Code of Federal Regulations (CFR) Part 25, which sets out standards for aircraft airworthiness. For aircraft passenger seats, § 25.561 and § 25.562 of Title 14 specify requirements for seat structures that may give passengers a reasonable chance of escaping serious injury in a minor crash landing situation.

Main cabin or economy seats are typically constructed with a seat frame formed from spreaders and leg modules joined together by transverse beams. A seat bottom is typically mounted on the seat frame, and may be fixed or adjustable. A seat back is typically pivotally-mounted between two of the spreaders such that the angle of the seat back can be controlled for comfort, safety, and passenger ingress and egress past the rear of the seat. The degree of rearward recline movement is typically constrained by the position of the rearward row of seats and the requirement to leave the passenger seated behind a particular seat with sufficient room to enter and exit his or her own seat and use the meal tray. The degree of forward movement of the seat back is typically limited to a position where the seat back is in an upright sitting position for taxi, takeoff, and landing (TTOL).

Passenger seats are typically designed such that the seat back will not move forward past the upright sitting position under normal circumstances (e.g., including abuse loads). However, provision must also be made for the abnormal situation where severe G-force loads may propel a passenger forward toward the seat back directly in front of them. In such cases, the seat back must be allowed to move forward or "breakover" the seat bottom in a controlled manner in order to minimize or reduce injury to a passenger who may be thrown against the seat back during an emergency deceleration (e.g., high G-force) event.

For aircraft passenger seats, 14 CFR § 25.562 requires that for a high G-force event (e.g., in excess of 16 Gs), where head contact with seats or other structures may occur, some type of protection must be provided so that the so-called "Head Injury Criterion" (HIC) does not exceed 1000 units. 14 CFR § 25.785 has a primary goal of protecting occupants from serious injury during landing condition, including injurious interactions of the head and neck (ref. ANM-115-17-002). Conventional methods to generate a low HIC score typically involve either spacing passenger seats far apart (severely limiting options for seating arrangements which increase the number of seats within the cabin), or building a breakover mechanism into the seat back.

In conventional seat designs, the seat back rotates about a fixed pivot and the breakover mechanism includes a sacrificial component (e.g., breakable bushing part, shear pin, etc.), purposely built into the seat structure, allowing the seat back to rotate forward upon impact. In some instances, it may be desirable to provide a seat that articulates via links instead of a standard pivot.

Therefore, what is needed is a breakover assembly usable in conjunction with links and more complex rotations.

BRIEF SUMMARY

According to one aspect, the inventive concepts according to the present disclosure are directed to a passenger seat assembly including a frame assembly including spaced frame members, a seat bottom positioned between the spaced frame members, and a seat back positioned between the spaced frame members. In embodiments, lower links are positioned on opposite lateral sides of the seat back with each lower link attached at a first end to one of the spaced frame members and at a second end to a pivot axis of the seat back and the seat bottom. In embodiments, upper links are positioned on opposite lateral sides of the seat back with each upper link attached at a first end to one of the spaced frame members and at a second end to the seat back. In use, in a first operating state of the passenger seat assembly, the lower links and the upper links rotate in a synchronous manner to move the seat back and the seat bottom between an upright sitting position and a reclined sitting position. In use, in a second operating state of the passenger seat assembly, the lower links are fixed and the upper links are constrained to rotate forward over center of the pivot axis to rotate the seat back forward past the position of the seat back when in the upright sitting position.

In some embodiments, the first operating state corresponds to normal use of the passenger seat assembly, and the second operating state corresponds to a dynamic event in which a load value on the seat back exceeds a predetermined load value resulting from a deceleration event.

In some embodiments, when the passenger seat assembly is operating in the second operating state, during a first portion of forward rotation the upper links are configured to stretch until reaching their apex, and during a second portion of forward rotation, after reaching their apex, the upper links are configured to relax toward their original unstretched state.

In some embodiments, when operating in the first operating state of the passenger seat assembly, each of the upper links remains inclined in an aft direction, and when operating in the second operating state of the passenger seat assembly, each of the upper links rotates to an orientation inclined in a forward direction of the passenger seat assembly.

In some embodiments, the upper links include at least one of a metal alloy and an elastomeric material.

In some embodiments, a modulus of elasticity of the lower links is greater than a modulus of elasticity of the upper links.

In some embodiments, the upper links differ from the lower links in terms of at least one of link length and link thickness.

In some embodiments, the pivot axis of the seat bottom and the seat back shifts as the passenger seat assembly transitions between the upright sitting position and the reclined sitting position.

In some embodiments, the pivot axis of the seat bottom and the seat back is positioned below and forward of an axis of rotation of the upper links.

In some embodiments, the upper links and the lower links are provided in a symmetrical arrangement on left and right lateral sides of the passenger seat assembly.

According to another aspect, the inventive concepts according to the present disclosure are directed to an aircraft passenger seat including a frame assembly including spaced frame members, a seat bottom positioned between the spaced frame members, and a seat back positioned between the spaced frame members, the seat back rotatably connected to the seat bottom at a pivot. In embodiments, the seat includes lower links movably coupling the pivot to the spaced frame members, and upper links movably coupling the seat back to the spaced frame members. In use, in a first operating state of the passenger seat, the lower links and the upper links rotate in a synchronous manner to move the seat back and the seat bottom between an upright sitting position and a reclined sitting position, and in a second operating state of the passenger seat, the lower links are fixed and the upper links are constrained to rotate forward over center of the pivot to rotate the seat back forward past the position of the seat back when in the upright sitting position.

According to a further aspect, the inventive concepts according to the present disclosure are directed to a method for controlling a position adjustable seat back. In embodiments, the method includes providing a passenger seat assembly including a frame assembly including spaced frame members, a seat bottom positioned between the spaced frame members, a seat back positioned between the spaced frame members, lower links positioned on opposite lateral sides of the seat back, each lower link attached at a first end to one of the spaced frame members and at a second end to a pivot axis of the seat back and the seat bottom, and upper links positioned on opposite lateral sides of the seat back, each upper link attached at a first end to one of the spaced frame members and at a second end to the seat back. In embodiments, during normal use of the seat back, the lower links and the upper links are rotated in a synchronous manner to move the seat back between an upright position and a reclined position, and during a dynamic event affecting the seat back, the lower links are fixed and the upper links rotate forward over center of the pivot axis to rotate the seat back forward past the upright position of the seat back.

This summary is provided solely as an introduction to subject matter that is fully described in the following detailed description and drawing figures. This summary should not be considered to describe essential features nor be used to determine the scope of the claims. Moreover, it is to be understood that both the foregoing summary and the following detailed description are explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description refers to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
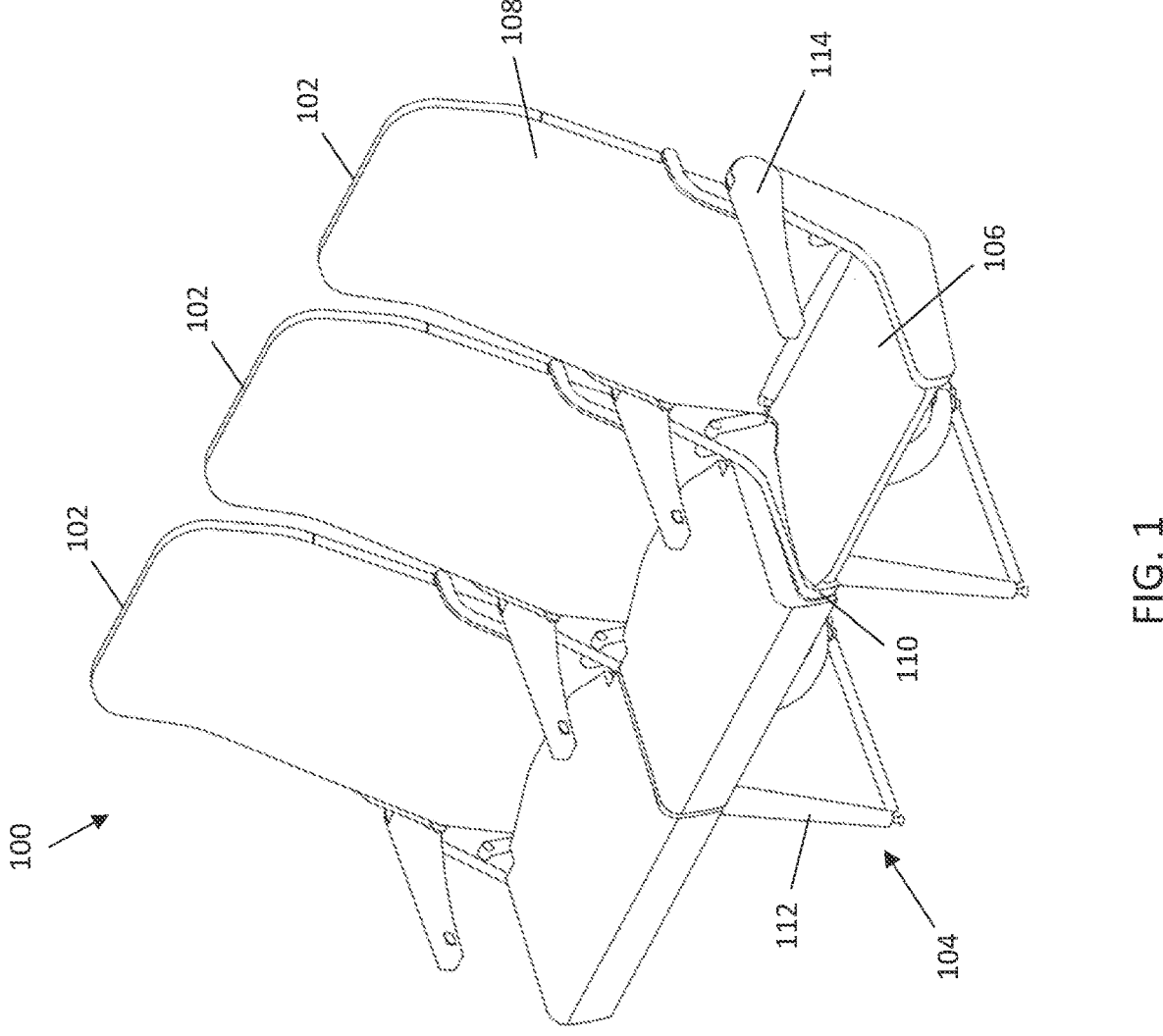
FIG. 1 is a front isometric view of a seat row including laterally-adjacent passenger seats each equipped with a dynamic breakover assembly, in accordance with example embodiments of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to an aircraft passenger seat assembly that articulates via links versus a standard seat back pivot. In embodiments, seat motion between an upright sitting position and a reclined position is controlled by synchronizing the rotational motions of lower and upper links. The lower links connect frame members to the seat bottom/seat back pivot. The upper links connect the seat back to the frame members. Because of the more complex rotation provided by the links, as compared to a single seat back pivot, when enough force is applied to the seat back during a dynamic event, the upper links are caused to over center the seat bottom/seat back pivot. The inclination of the upper links, and the position of the frame member pivot point is such that, when enough force is applied to the seat back, the upper links are forced to over center into a breakover position as a result of the seat pack wanting to rotate around the seat bottom/seat back pivot, but being constrained to follow the path of the upper links as the lower links are fixed. Given enough force, the elastic modulus of the upper links allows the over centering via a temporary deformation of the material elasticity (e.g., stretch and revert back in shape). In some embodiments, the upper links are configured to stretch during a first portion of forward rotation until reaching their rotation apex, and thereafter during a second portion of the forward rotation the upper links relax or revert back to their original state. The temporary deformation allows the seat back to rotate forward and remain forward after the conclusion of the dynamic event. In embodiments, the upper links can be customized in terms of material, thickness, link length, shape, etc.

As used herein, the term "normal" with regard to the use of the aircraft passenger seat assembly refers to loads that are typical during regular use of the seat, including for example loads imposed by passengers pushing or leaning on the seat back unit during ingress and egress, and minor rear impacts such as may occur during moderately hard landings or short stops upon landing. As used herein, the term "dynamic event" refers to any load in excess of a normal load (as may happen during a high G-force event) and as specified in government regulations or aircraft manufacturer specifications. These requirements are well-known to all aircraft seat manufacturers. In general, such dynamic loads may be in the range of 16 Gs. As used herein, normal use of the aircraft passenger seat assembly may therefore correspond to loads not exceeding a predefined threshold load value (e.g., less than about 16 Gs), whereas dynamic event loads may correspond to load values exceeding the predefined threshold load value (e.g., about 16 Gs and greater). In some embodiments, the breakover may occur at a predefined threshold load value less than 16 Gs (e.g., starts to perform at 11-12 Gs) to ensure that the seat performs to breakover at 16 Gs or greater as required.

FIG. 1 illustrates a seat row 100 including a plurality of laterally adjacent passenger seats 102. The seat row 100 generally, and each passenger seat 102, includes a frame assembly 104 supporting a seat bottom 106 and a seat back 108. In embodiments, the frame assembly 104 may include frame members 110 and legs 112 attached to one or more transverse beams. As well-known to aircraft seat manufacturers, the frame members 110 may be spreaders configured to further attach armrests 114. In the case of a single seat, the frame assembly 104 may include two spaced spreaders, two legs, and at least one transverse beam. In the case of a seat row 100, for example the seat row shown including three laterally adjacent passenger seats 102, the frame assembly 104 may include multiple spreaders, multiple legs, and at least one transverse beam.

Figure 2:
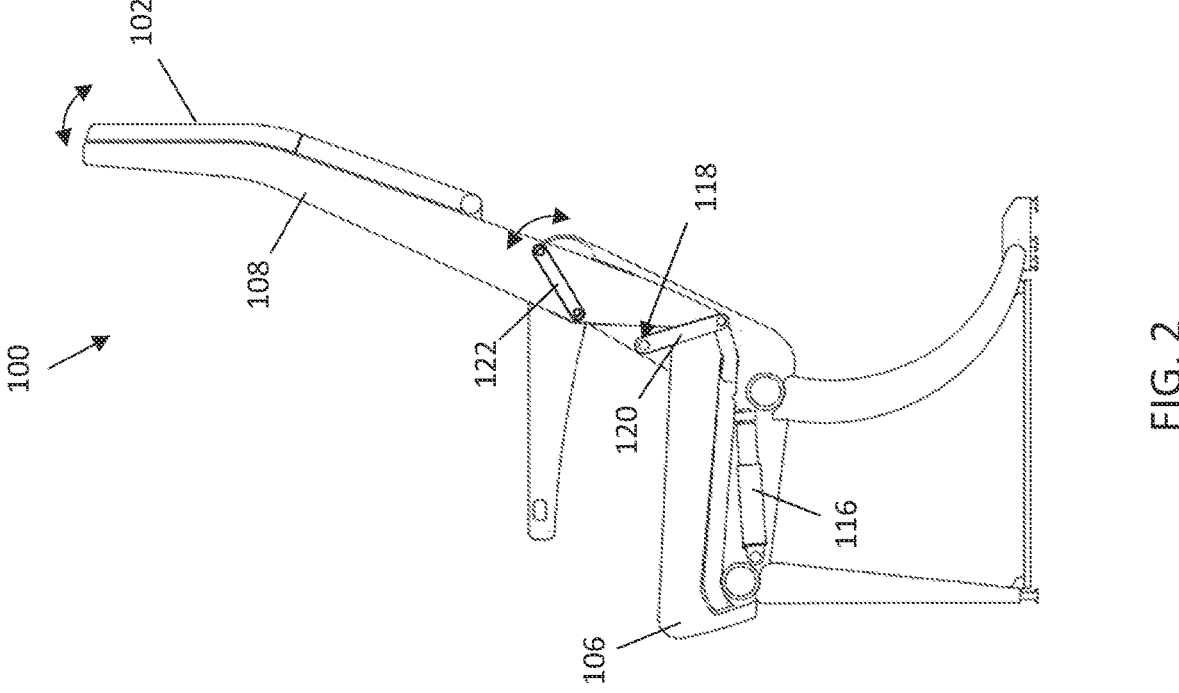
FIG. 2 is a side view of one of the passenger seats of the seat row shown in an upright sitting position for taxi, takeoff, and landing, in accordance with example embodiments of this disclosure.
Figure 3:
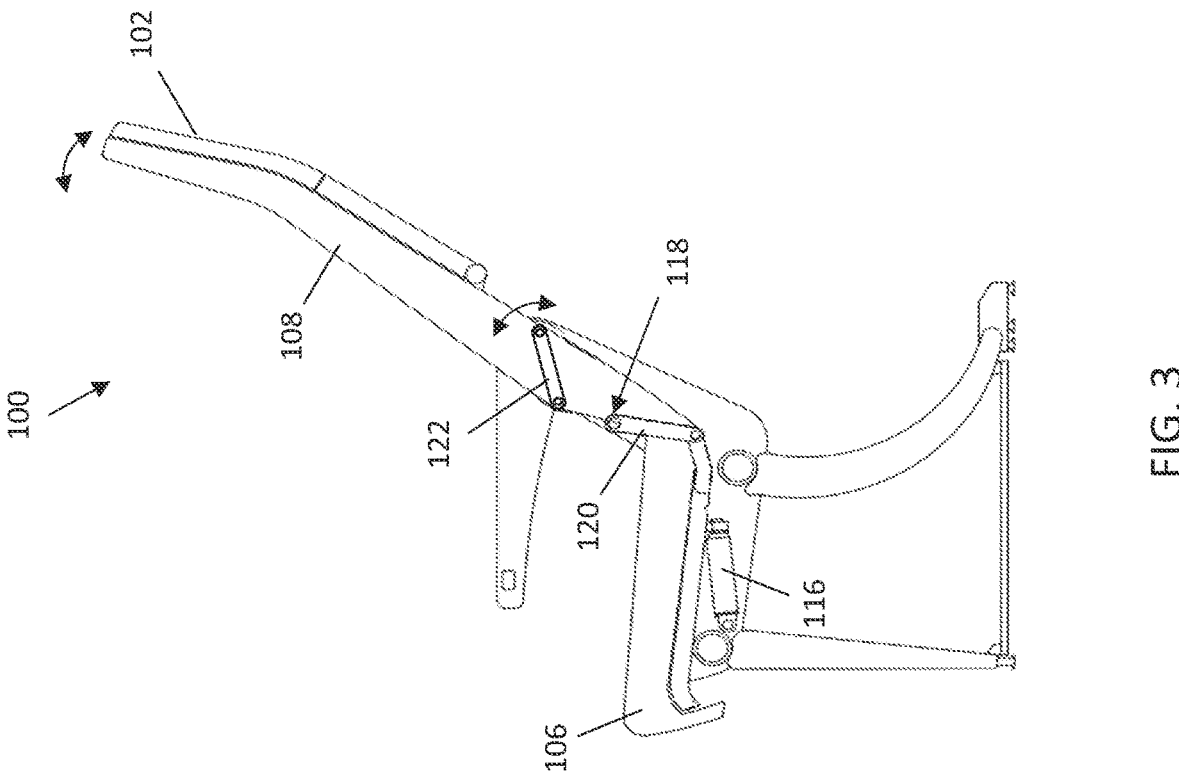
FIG. 3 is a side view of the passenger seat shown in a reclined sitting position, in accordance with example embodiments of this disclosure.
Figure 4:
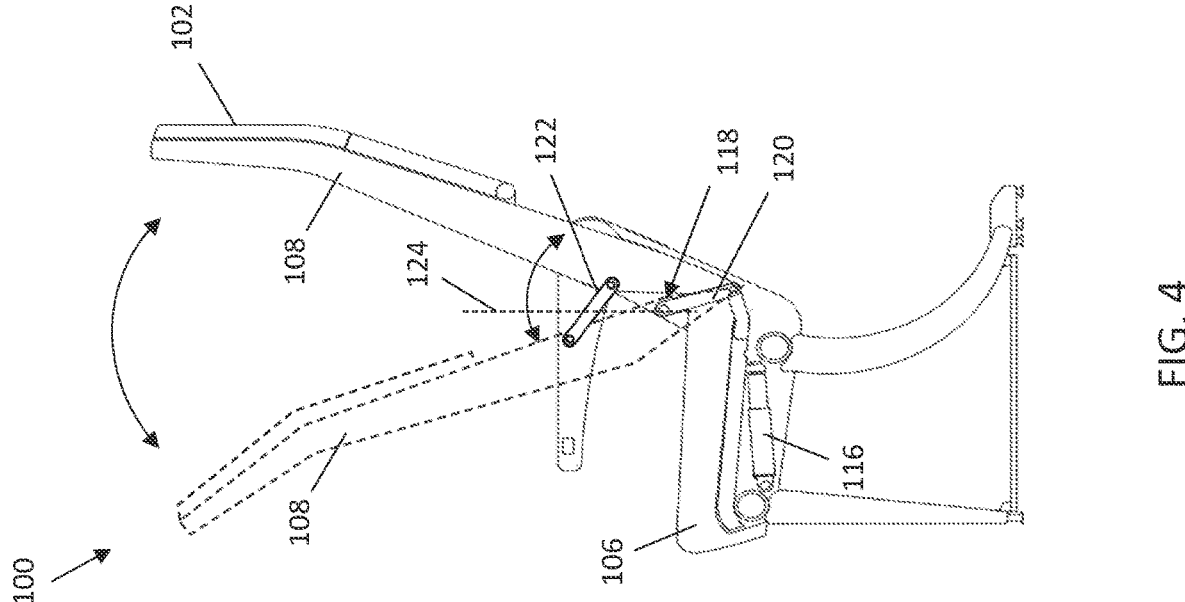
FIG. 4 is a side view of the passenger seat shown in a forward breakover position, in accordance with example embodiments of this disclosure.

The seat bottom 106 and the seat back 108 of each seat 102 are positioned between two spaced frame members 110, for instance a 'left' spreader and a 'right' spreader. The seat bottom 106 may be fixed or may be movable. In embodiments, seat bottom and seat back motions are synchronized such that the seat bottom 106 shifts forward as the seat back 108 reclines, and vice versa. In embodiments, seat bottom motion may be purely translational or combined translational and rotational such that the seat bottom tilt changes as the seat back reclines. FIG. 1 shows the passenger seats 102 positioned in an upright sitting position for TTOL. When in the upright sitting position, the seat bottom 106 is locked in position using a mechanism such as a locking gas spring 116 as shown in FIGS. 2-4 coupled between the seat bottom 106 and the frame assembly. In use, the gas spring 116 locks to prevent seat bottom motion and unlocks to allow seat bottom motion. Unlocking may be achieved using a traditional Bowden style cable configuration including an actuator located in one of the seat armrests.

FIG. 2 illustrates the seat row 100, or one of the passenger seats 102, from the side to show the upright sitting position of the seat. The seat bottom 106 and the seat back 108 are pivotally connected at a seat bottom/seat back pivot 118. A pair of lower links 120 includes a first or 'left' lower link positioned on the left lateral side of the seat, and a second or 'right' lower link (not shown) positioned on the right lateral side of the seat. In embodiments, the lower links 120 are symmetrically arranged on opposite sides of the seat. Each lower link 120 is rotatably attached at one end to the pivot 118, and is rotatably attached at its opposing end to one of the spaced frame members 110 (e.g., fixed spreader).

Each seat 102 is further equipped with a pair of upper links 122 including a first or 'left' upper link positioned on the left lateral side of the seat back 108, and a second or 'right' upper link (not shown) positioned on the right lateral side of the seat back 108. In embodiments, the upper links 122 are likewise symmetrically arranged. Each upper link 122 is rotatably attached at one end to the seat back 108, and rotatably attached at the opposing end to one of the spaced frame members 110 (e.g., same fixed spreader to which the corresponding lower link attaches to). As shown in FIG. 2, during normal use of the seat assembly when the seat back 108 is positioned in the upright sitting position, the lower links 120 have a first inclination. In addition, the axis of rotation of the upper links 122 is positioned above and slightly aft of the axis of rotation of the lower links 120. In this configuration, the seat back 108 is controlled to rotate around the arc path of the lower links 120.

FIG. 3 illustrates the seat adjustability during normal use of the seat (e.g., without breakover 'activated'). When in the upright sitting position as shown in FIG. 2, the seat back 108 is comparatively more vertical, the seat bottom 106 is comparatively more horizontal and aft, and the lower links 120 are inclined in the forward direction. When in the reclined sitting position as shown in FIG. 3, the seat back 108 is comparatively less vertical, the seat bottom 106 may be tilted differently and shifted forward, and the seat bottom/seat back pivot axis 118 is shifted forward by way of lower link 120 rotation forward. Regarding the upper links 122, movement from the upright sitting position to the reclined position may result in the upper links 122 becoming more horizontal. In embodiments, in a first operating state of the seat 102 corresponding to the normal use of the seat, the lower links 120 and the upper links 122 rotate in a synchronous manner to provide the desired motion between the upright sitting position and the reclined sitting position, as well as the resultant positions of the seat bottom 106 and the seat back 108 in each of the sitting positions as well as in intermediate sitting positions. By controlling the seat motion with links as opposed to a single pivot, the seat motion is more customizable.

FIG. 4 illustrates a second operating state of the passenger seat 102 corresponding to motion that takes place during a dynamic event (e.g., extreme force on the seat back 108). When locked in the upright sitting position for TTOL, for instance by the locking gas spring 116 locking the motion of the seat bottom 106, the lower links 120 are therefore fixed. When the load on the seat back 108 exceeds the predefined threshold load value, the upper links 122 are configured to rotate in the forward direction to rotate the seat back 108 forward past the upright sitting position. When the forward seat back motion is complete, the seat back 108 comes to rest in the forward position as shown by the dashed lines.

The forward seat back 108 motion is made possible by the fixed lower links 120 and the configuration of the upper links 122 that causes the constrained upper links 122 to rotate around the arc path of the lower links 120. The upper links 122, constrained at their attached ends to the spaced frame members, are caused to rotate over center 124 of the pivot axis 118 of the seat bottom/seat back. In embodiments, when the passenger seat assembly is operating in the second operating state, the upper links 122 are configured to deform by stretching to absorb energy during a first portion of forward rotation of the upper links 122. As the upper links 122 reach their rotational apex and rotate over center, the elastic modulus of the upper links 122 causes the stretched upper links 122 to relax and want to revert to their original state. In other words, each upper link 122 performs under tension by deforming to a point at which the seat back 108 is forward enough that the tension on the link subsides thereby allowing the link to revert to its original state, or at least with reduced tension on the link. By temporarily deforming the upper links 122, the seat back 108 is able to rotate forward past a point in which the seat back 108 is unable to rotate back toward the upright position, thereby facilitating seat egress.

Comparing FIGS. 2 and 3 with FIG. 4, the upper links 122 rotate from an orientation inclined in the aft direction during normal use of the seat, to an orientation inclined in the forward direction following the dynamic event, and in some embodiments vice versa. In embodiments, the upper links are made from a metal alloy (e.g., aluminum alloy), elastomeric material, elastoplastic material, and combinations thereof. In embodiments, the modulus of elasticity of the links allows for the temporary deformation. In some embodiments, the modulus of elasticity of the lower links 120 may be greater than the modulus of elasticity of the upper links 122, and the upper links 122 may differ from the lower links 120 in terms of at least one of length, shape, and thickness. In some embodiments, the upper links 122 may interact with a mechanical stop to limit further forward rotation of the seat back.

From the above description, it is clear that the inventive concepts disclosed herein are well adapted to achieve the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A passenger seat assembly, comprising:
a frame assembly including spaced fixed frame members;
a seat bottom positioned between the spaced fixed frame members;

a seat back positioned between the spaced fixed frame members;
lower links positioned on opposite lateral sides of the seat back, each lower link attached at a first end to one of the spaced fixed frame members and at a second end to a pivot axis of the seat back and the seat bottom; and
upper links positioned on opposite lateral sides of the seat back, each upper link directly attached at a first end to one of the spaced fixed frame members and at a second end to the seat back;
wherein:
in a first operating state of the passenger seat assembly, the lower links and the upper links rotate to move the seat back and the seat bottom between an upright sitting position and a reclined sitting position; and
in a second operating state of the passenger seat assembly, the lower links are fixed and the upper links are constrained to rotate forward over center of the pivot axis to rotate the seat back forward past the position of the seat back when in the upright sitting position.

2. The passenger seat assembly according to claim 1, wherein:
the first operating state corresponds to normal use of the passenger seat assembly; and
the second operating state corresponds to a dynamic event in which a load value on the seat back exceeds a predetermined load value resulting from a deceleration event.

3. The passenger seat assembly according to claim 1, wherein, when the passenger seat assembly is operating in the second operating state:
during a first portion of forward rotation the upper links are configured to stretch until reaching their apex; and
during a second portion of forward rotation, after reaching their apex, the upper links are configured to relax toward their original unstretched state.

4. The passenger seat assembly according to claim 1, wherein:
when the passenger seat assembly is operating in the first operating state, each of the upper links remains inclined in an aft direction; and
when the passenger seat assembly is operating in the second operating state, each of the upper links rotates to an orientation inclined in a forward direction of the passenger seat assembly.

5. The passenger seat assembly according to claim 1, wherein the upper links include at least one of a metal alloy and an elastomeric material.

6. The passenger seat assembly according to claim 1, wherein a modulus of elasticity of the lower links is greater than a modulus of elasticity of the upper links.

7. The passenger seat assembly according to claim 1, wherein the upper links differ from the lower links in terms of at least one of link length and link thickness.

8. The passenger seat assembly according to claim 1, wherein the pivot axis of the seat bottom and the seat back shifts as the passenger seat assembly transitions between the upright sitting position and the reclined sitting position.

9. The passenger seat assembly according to claim 1, wherein the pivot axis of the seat bottom and the seat back is positioned below and forward of an axis of rotation of the upper links.

10. The passenger seat assembly according to claim 1, wherein the upper links and the lower links are provided in a symmetrical arrangement on left and right lateral sides of the passenger seat assembly.

11. An aircraft passenger seat, comprising:

a frame assembly including spaced fixed frame members;

a seat bottom positioned between the spaced fixed frame members;

a seat back positioned between the spaced fixed frame members, the seat back rotatably connected to the seat bottom at a pivot;

lower links movably coupling the pivot to the spaced fixed frame members; and upper links directly attached to the space fixed frame members, the upper links movably coupling the seat back to the spaced fixed frame members;

wherein:

in a first operating state of the passenger seat, the lower links and the upper links rotate to move the seat back and the seat bottom between an upright sitting position and a reclined sitting position; and in a second operating state of the passenger seat, the lower links are fixed and the upper links are constrained to rotate forward over center of the pivot to rotate the seat back forward past the position of the seat back when in the upright sitting position.

12. The aircraft passenger seat according to claim 11, wherein:

the first operating state corresponds to normal use of the aircraft passenger seat; and the second operating state corresponds to a dynamic event in which a load value on the seat back exceeds a predetermined load value resulting from a deceleration event.

13. The aircraft passenger seat according to claim 11, wherein, when in the second operating state:

during a first portion of forward rotation the upper links are configured to stretch until reaching their apex; and during a second portion of forward rotation, after reaching their apex, the upper links are configured to relax toward their original unstretched state.

14. The aircraft passenger seat according to claim 11, wherein:

the upper links are inclined in a first direction when in the first operating state; and the upper links are inclined in a second direction, opposite the first directed, when in the second operating state.

15. The aircraft passenger seat according to claim 11, wherein the upper links include at least one of a metal alloy and an elastomeric material.

16. The aircraft passenger seat according to claim 11, wherein a modulus of elasticity of the lower links is greater than a modulus of elasticity of the upper links.

17. The aircraft passenger seat according to claim 11, wherein the upper links differ from the lower links in terms of at least one of link length and link thickness.

18. A method for controlling a position adjustable passenger seat, the method comprising the steps of:

providing a passenger seat assembly, comprising:

a frame assembly including spaced fixed frame members;

a seat bottom positioned between the spaced fixed frame members;

a seat back positioned between the spaced fixed frame members;

lower links positioned on opposite lateral sides of the seat back, each lower link attached at a first end to one of the spaced fixed frame members and at a second end to a pivot axis of the seat back and the seat bottom; and upper links positioned on opposite lateral sides of the seat back, each upper link directly attached at a first end to one of the spaced fixed frame members and at a second end to the seat back;

during normal use of the passenger seat, rotating the lower links and the upper links to move the seat back between an upright position and a reclined position; and during a dynamic event affecting the seat back, fixing the lower links and rotating the upper links forward over center of the pivot axis to rotate the seat back forward past the upright position of the seat back.

19. The method according to claim 18, wherein, during the dynamic event affecting the seat back:

during a first portion of forward rotation the upper links are configured to stretch until reaching their apex; and during a second portion of forward rotation, after reaching their apex, the upper links are configured to relax toward their original unstretched state.

20. The method according to claim 18, wherein:

the upper links are inclined in the aft direction during the normal use of the seat back; and during the second dynamic event affecting the seat back, the upper links rotate from being inclined in the aft direction to an orientation in which the upper links are inclined and remain inclined in the forward direction.

* * * * *